United States Patent [19]

Donato et al.

[11] Patent Number: 5,266,391
[45] Date of Patent: Nov. 30, 1993

[54] COMPOSITE POROUS MEMBRANES

[75] Inventors: Karen A. Donato, Gaithersburg, Md.; Lessie C. Phillips, Huntersville, N.C.

[73] Assignee: Hoechst Celanese Corporation, Somerville, N.J.

[21] Appl. No.: 994,213

[22] Filed: Dec. 18, 1992

[51] Int. Cl.$^5$ .................... B01D 29/00; B32B 5/14; C08J 9/36

[52] U.S. Cl. .................... 428/220; 210/490; 210/500.27; 210/500.34; 210/500.35; 210/500.36; 210/500.4; 210/500.41; 210/500.42; 428/308.4; 428/315.7; 521/53; 521/54

[58] Field of Search ............ 428/220, 308.4, 315.7; 210/490, 500.27, 500.34, 500.35, 500.36, 500.4, 500.41, 500.42; 521/53, 54

[56] References Cited

U.S. PATENT DOCUMENTS

| | | | |
|---|---|---|---|
| 4,629,744 | 12/1986 | Uematsu et al. | 428/220 |
| 5,171,627 | 12/1992 | Brolkingham et al. | 428/220 |

*Primary Examiner*—Morton Foelak
*Attorney, Agent, or Firm*—Philip P. McCann

[57] ABSTRACT

The composite membrane is disclosed having a microporous support which is coated with a polymer selected from the group consisting of polyethylene oxide, polyacrylic acid, poly(methyl methacrylate) and polyacrylamide wherein there is no pore filing of the microporous support. A process for making and a process for using the membrane is also disclosed.

5 Claims, No Drawings

COMPOSITE POROUS MEMBRANES

BACKGROUND OF THE INVENTION

1. Field of the Invention

The present invention relates to composite type membranes which may be used in various membrane processes. The membranes include microporous supports which are coated with a polymer selected from the group consisting of polyethylene oxide, polyacrylic acid, poly(methyl methacrylate) and polyacrylamide. The present invention also relates to a method for making such membranes and using such membranes in membrane processes.

2. Description of the Prior Art

Coated membranes and membrane processes are used widely in many fields of technology. These processes generally involve the permeation of gases or liquids through polymeric membranes wherein the membrane prevents hydrodynamic flow so that the transport therethrough is controlled by absorption or diffusion.

Membranes are typically selected on how they transport the fluids therethrough. The rate of transport through a membrane is a function of its permeability, generally referred to as flux. Liquid permeation for example, involves the permeation of feed components from the liquid phase on one side of the membrane to the liquid phase on the other side at a controlled rate.

As discussed, the selectivity of coated membranes is an important factor in the satisfactory operation of the membrane processes, which may include separation or delayed diffusion. In addition, membrane properties such as flux and resistance to chemical, biological and physical degradation also effect the efficiency of such processes.

Of course, there have been many efforts to develop composite membranes which function efficiently for specific processes. Typical of such efforts include the development of composite type membranes such as those disclosed in U.S. Pat. Nos. 4,242,159, 4,260,652, 4,277,344, and 4,388,189. These membranes include a microporous support having coated thereon a thin layer of polymeric material. However, previously known composite membranes have not been completely satisfactory for all processes, since they can or may exhibit a variety of defects that affect flux and physical, chemical and biological degradation resistance and thus the overall efficiency of the membrane processes for which they are used.

In an effort to overcome the above described deficiencies in composite type membranes, there have recently been attempts to produce composite type membranes wherein the polymeric coating is a UV curable material. The basic UV curable formulation generally includes a UV reactive unsaturated polymeric material, a photocatalyst and a reactive diluent.

For example, Japanese Kokai Patent No. Sho 59-76504(1984) describes a reverse osmosis membrane which is manufactured by impregnating a porous support with a mixture of monofunctional monomer and bifunctional monomer and irradiating the mixture with light to polymerize the monomers. U.S. Pat. No. 4,618,533 suggests the membrane coated with polymeric material may be cured using ultraviolet light. U.S. Pat. Nos. 4,976,897 and 5,102,552, which have been assigned to the assignee of the present invention, describe a composite membrane having a microporous support which is coated with a UV curable polymeric composition having a sufficiently high viscosity to prevent pore filling upon coating and curing. The UV curable resin coated composite membrane exhibited suitable resistance to physical, chemical and biological degradation while exhibiting adequate flux for specific uses.

Another approach to application of a coating to the microporous membrane is to change the surface of the hydrophobic microporous membrane to a hydrophilic one. This is especially true when polyolefinic films, a preferred type of polymeric material often employed in the manufacture of microporous membranes, are employed. Because these films are not "wetted" with water and most aqueous solutions, they could not be used advantageously in various applications. Such proposals have been put forth in the past to overcome these problems, such as exemplified by U.S. Pat. Nos. 3,853,601; 3,231,530; 3,215,486 and Canadian Patent No. 981,991 which utilize a variety of hydrophilic coating agents or impregnants. Such coating agents or impregnants, although effective for a limited period of time, tend to be removed in a relatively short period of time by solutions which contact the membrane.

Others have attempted to impart hydrophilic character to a normally hydrophobic microporous membrane by the use of low energy plasma treatments. Such plasma treatments are achieved by first activating surface sites of the microporous membrane using argon or hydrogen plasma and then grafting thereto an appropriate free radical polymerizing species such as acrylic acid. Such plasma treatments result in a film having only a surface which is wettable. The surface of the membrane also becomes plugged when wet, which then inhibits or prevents the free flow of water through the interior of the membrane. The unavoidable plugging of the pores renders the membrane unsuitable for certain applications.

Surface modification treatments such as corona treatment is used with microporous membranes for adhesiveness and permeability. U.S. Pat. No. 5,085,775 discloses corona treatment of microporous backing material to improve or increase the adhesion to the microporous polysulfonic support. U.S. Pat. No. 5,013,439 discloses corona treatment of microporous polymer film to render the films permeable.

Coating polymeric materials on the porous supports followed by curing has generally been found to result in membranes having low flux. Conventional wisdom is that such coatings tend to wick up and fill the pores of the microporous support, thereby producing a membrane having an insufficient flux.

This failure is unfortunate since such polymeric systems have the potential to be tremendously advantageous in the area of membrane processes, since a wide range of chemical and mechanical properties may be built into the polymeric systems, thereby producing membranes having improved resistance to chemical, physical and biological degradation. Also, the simplicity of these systems compared to conventional systems is potentially appealing, in that they involve solventless processes.

The development of a useful polymeric coated composite membrane for application of membrane processes to impart specific flux control to the membrane would therefore be an extremely important and a desirable development.

SUMMARY AND OBJECTS OF THE INVENTION

In view of the foregoing limitations and shortcomings of prior art composite membranes and the need in the art for improved composite membranes which may be used in various microporous processes including flux control, it is therefore a primary objective of the present invention to fulfill the need b providing a polymer coated composite membrane for use in membrane processes.

It is another object of the invention to provide a polymer coated composite membrane which exhibits suitable resistance to physical, chemical and biological degradation while exhibiting adequate or desired flux and diffusion rates.

It is yet another object of the present invention to provide a process for producing a polymer coated composite membrane wherein wicking up of the pores of the microporous support is avoided.

In one aspect, the present invention provides a composite membrane, including a microporous support and a polymer coating thereon. It has been found that by utilizing the polymer selected from a specific group, a composite membrane may be produced which has substantially no pore fill, which minimizes the problems associated with wicking up experienced by prior art composite membranes. This allows for production of membranes having suitable flux and diffusion, and resistant to physical, chemical and biological degradation.

In another aspect, the present invention relates to a process of producing such a coated microporous membrane. The process includes coating the microporous support with a polymer selected from a group consisting of polyethylene oxide, polyacrylic acid, poly(methyl methacrylate) and polyacrylamide. In yet another aspect, the present invention relates to the use of the membranes in a diffusion controlled process.

With the foregoing and other objects, advantages and features of the invention that will become hereinafter apparent, the nature of the invention may be more clearly understood by reference to the following detailed description of the invention and the appended claims.

DETAILED DESCRIPTION OF THE INVENTION

As mentioned hereinabove, the coated microporous membrane of the present invention includes a microporous support, commonly known as a microporous polymer film, which is coated with a polymer selected from a group consisting of polyethylene oxide, polyacrylic acid, poly(methyl methacrylate) and polyacrylamide.

The membrane support may be any of those specifically used in the art. For example, polyolefin supports such as those formed from polyethylene, polypropylene and polymethylpentene, polystyrene, or substituted polystyrene supports, fluorinated polymer supports such as those formed from polytetrafluoro ethylene, polysulphone supports, polyester supports such as those formed from polyethylene terephthalate and polybutylene terephthalate, polyacrylate and polycarbonate supports, and supports formed from vinyl polymers such as polyvinyl chloride and polyacrylonitriles may be used in the present invention. The pore support should generally have an average pore width between about 0.005 and about 0.06 microns and preferably between about 0.02 and about 0.05 microns, an average pore length of from about 0.1 to about 0.25 microns; and a resistance to air flow (average) from 10 to about 100 Gurley second, preferably from about 25 to about 60 Gurley second as measured by the test method ASTM-726(B). Of course, the materials and processes of a particular support may vary according to its ultimate end-use in a particular separation process.

Microporous membranes can be classified into two general types: one type in which the pores are interconnected i.e., a closed-cell membrane, and the other type in which the pores are essentially interconnected through passages which may extend from one exterior surface or surface region to another, i.e., an opencelled membrane. The preferred microporous membrane of the present invention are of the latter type.

Membranes possessing this microporous structure are described, for example, in U.S. Pat. No. 3,426,754 and 3,853,601 which patents are incorporated by reference. This preferred method of preparation described therein involves drawing or stretching at ambient temperatures, i.e., cold drawing a crystalline elastic starting film in an amount of about 10 to 300% of its original length, with subsequent stabilization by heat-setting of the drawn film under a tension such that the film is not free to shrink, or can shrink only to a limited extent generally less than 5%. Such membranes are commercially available from Hoechst Celanese Corporation under the Celgard ® trademark.

Polymers found suitable for preparing coated membranes of the present invention include the following polymers: polyethylene oxide, polyacrylic acid, poly(methyl methacrylate) and polyacrylamide. The polyethylene oxide preferably has a molecular weight from about 1 million to about 8 million; the polyacrylic acid has a molecular weight of about 750,000; the poly(methyl methacrylate) has a molecular weight of about 120,000; and the polyacrylamide has a molecular weight from about 5 million to about 6 million. Each of these polymers are commercially available from Aldrich Chemical Company.

Although the inventors do not wish to be held by any one theory to explain this phenomena, it is believed that in contrast to other polymers, the use of the specific polymer microporous support allows for a sufficient time to complete coating and drying before any significant wetting or pore filling of the pore support occurs. In addition, it has been surprisingly found that while pore filling is minimized, adequate bonding between the microporous support and the polymer coating is maintained. Therefore, a polymer selected from the group of polyethylene oxide, polyacrylic acid, poly(methyl methacrylate) and polyacrylamide has been found to be satisfactory.

The coated membrane of the present invention may be prepared by conventional method well known in the art. That is, the porous support may be coated with the polymer using a suitable coating method known in the art. Some specific examples of known methods include two and three roll pressure coating, two and three roll reverse coating, knife coating or wire bar coating, dip coating, one and two roll kiss coating, nip coating, slot coating and gravure coating. The microporous support is typically coated once with the polymer. However, multiple coatings may also be applied. Both sides of the microporous membrane are coated.

Due to the potential advantages and areas of flexibility of chemical composition, dryability, ease of construction, coating thickness and flux, the membranes of the present invention may be used in a variety of different membrane processes. For example, the coated membranes may be used for separation processes as well as diffusion control processes. For example, the membrane may be used for the efficient transfer of liquids across the coated membrane for diffusion control processes.

The present invention is further illustrated by the following examples. These examples however, should not be construed as in any way, limiting the present invention. All parts and percentages in the examples in the remainder of the specification are by weight unless otherwise specified.

EXAMPLE

To demonstrate the use of the polymer coated membranes of the present invention, a Celgard ® 2400 microporous membrane was coated with various polymeric solutions including a polyethylene oxide have a molecular weight of 1 million, a polyethylene oxide having a molecular weight of 8 million, a poly(methyl methacrylate) having a molecular weight of 120,000 polyacrylamide having a molecular weight of about 5 million and a polyacrylic acid having a molecular weight of about 750,000. The solutions were 0.5 and 1 percent of polymer by weight of water.

In each of these cases no pore filing was evident. Celgard ® 2400 is a polypropylene support marketed by Hoechst Celanese Corporation and has an average pore diameter of 0.05 microns.

Although only preferred embodiments of the invention are specifically illustrated and described above, it will be appreciated that many modifications and variations of the present invention are possible in light of the above teachings, and within the purview of the amended claims without departing from the spirit and intentions within the scope of the invention.

We claim:

1. A coated microporous membrane comprising a microporous support characterized by having a crystallinity of at least 40%, an average pore width of from about 0.005 to about 0.06 microns, a void volume from about 30% to about 50%; said microporous polymeric film coated on at least one side with a polymer wherein the polymer is selected from the group consisting of polyethylene oxide, polyacrylic acid, poly(methyl methacrylate) and polyacrylamide and the polymer does not penetrate into the pores of the microporous support.

2. A coated microporous membrane of claim 1 wherein the microporous support is open-celled and has an average pore length of from about 0.1 to about 0.25 microns.

3. A coated microporous membrane according to claim 2 wherein the microporous support is selected from the group consisting of polyolefin supports, polystyrene supports, substituted polystyrene supports, fluorinated polymer supports, polysulfone supports, polyester supports, polyacrylate supports, polycarbonate supports and vinyl polymer supports.

4. A coated microporous membrane of claim 1 where said polyethylene oxide has a molecular weight from about 1 million to about 8 million; said polyacrylic acid has a molecular weight of about 750,000; said poly(methyl methacrylate) has a molecular weight of about 120,000; and said polyacrylamide has a molecular weight from about 5 million to about 6 million.

5. A membrane delay process according to claim 3 wherein the support is open-celled and has an average pore width of from about 0.02 to about 0.05 microns.

* * * * *